United States Patent
Schumann et al.

(10) Patent No.: US 10,730,496 B2
(45) Date of Patent: Aug. 4, 2020

(54) HYDRAULIC UNIT

(71) Applicant: Robert Bosch GmbH, Stuttgart (DE)

(72) Inventors: Beate Schumann, Lauffen am Neckar (DE); Bernd Haeusser, Neckarwestheim (DE); Oliver Gaertner, Abstatt (DE); Horst Beling, Heilbronn (DE); Wolfgang Mailaender, Hemmingen (DE); Wolfgang Schuller, Cleebronn (DE); Rolf Stotz, Vaihingen (DE); Oliver Hennig, Obersulm (DE); Goekhan Oezkan, Kanagawa (JP); Michael Schuessler, Seckach (DE)

(73) Assignee: Robert Bosch GmbH, Stuttgart (DE)

( * ) Notice: Subject to any disclaimer, the term of this patent is extended or adjusted under 35 U.S.C. 154(b) by 171 days.

(21) Appl. No.: 15/303,064

(22) PCT Filed: Feb. 16, 2015

(86) PCT No.: PCT/EP2015/053189
§ 371 (c)(1),
(2) Date: Oct. 10, 2016

(87) PCT Pub. No.: WO2015/154901
PCT Pub. Date: Oct. 15, 2015

(65) Prior Publication Data
US 2017/0021814 A1  Jan. 26, 2017

(30) Foreign Application Priority Data
Apr. 10, 2014 (DE) .................. 10 2014 206 906

(51) Int. Cl.
*B60T 8/36* (2006.01)
*B60T 8/40* (2006.01)
(Continued)

(52) U.S. Cl.
CPC ............ *B60T 8/4068* (2013.01); *B60T 8/368* (2013.01); *B60T 8/4031* (2013.01);
(Continued)

(58) Field of Classification Search
CPC ...... B60T 8/4068; B60T 8/368; B60T 8/4031; F04B 53/16; F04B 53/14; F04B 53/001; F04B 19/22; F04B 1/0421; F04B 1/0404
(Continued)

(56) References Cited

U.S. PATENT DOCUMENTS 5,209,553 A * 5/1993 Burgdorf ................ B60T 8/341
303/116.1
5,244,262 A * 9/1993 Kehl ...................... B60T 8/368
137/596.17
(Continued)

FOREIGN PATENT DOCUMENTS

DE      103 02 681 B3   8/2004
DE  10 2008 002 740 A1  12/2009
(Continued)

OTHER PUBLICATIONS

International Search Report corresponding to PCT Application No. PCT/EP2015/053189, dated Sep. 9, 2015 (German and English language document) (7 pages).

*Primary Examiner* — Christopher P Schwartz
(74) *Attorney, Agent, or Firm* — Maginot, Moore & Beck LLP (57) ABSTRACT

A hydraulic unit, in particular for a controllable-slip vehicle brake system, includes a housing block, a pump, a first fluid duct, and a second fluid duct. The housing block defines a pump receptacle that receives the pump, which has a suction side and a pressure side. The first duct crosses the pump receptacle in a region of the pressure side of the pump. The second duct leads into the pump receptacle in the region of
(Continued)

the pressure side. The first and second ducts are sealed off from each over via a separation point. The hydraulic unit is configured to enable contact with a damping device configured to damp pulsations and reduce operating noise of the hydraulic unit without negatively impacting functional properties of the hydraulic unit, in particular on pressure build-up dynamics of the vehicle brake system, or without jeopardizing a compact construction of the hydraulic unit.

14 Claims, 5 Drawing Sheets (51) Int. Cl.
    *F04B 53/16*       (2006.01)
    *F04B 1/0421*     (2020.01)
    *F04B 1/0404*     (2020.01)
    *F04B 19/22*       (2006.01)
    *F04B 53/00*       (2006.01)
    *F04B 53/14*       (2006.01)

(52) U.S. Cl.
    CPC .......... *F04B 1/0404* (2013.01); *F04B 1/0421* (2013.01); *F04B 19/22* (2013.01); *F04B 53/001* (2013.01); *F04B 53/14* (2013.01); *F04B 53/16* (2013.01)

(58) Field of Classification Search
    USPC .............. 303/10, 87, 116.4, 119.3, DIG. 10; 417/434, 546, 569
    See application file for complete search history.

(56) References Cited

U.S. PATENT DOCUMENTS

| | | | | |
|---|---|---|---|---|
| 5,460,438 | A | * | 10/1995 | Hellmann ............... B60T 8/368 138/30 |
| 6,079,961 | A | * | 6/2000 | Schuller ................ B60T 8/4031 417/470 |
| 6,113,365 | A | * | 9/2000 | Siegel ................... F04B 1/0404 417/434 |
| 6,340,295 | B1 | * | 1/2002 | Hauser .................. B60T 8/4031 417/470 |
| 6,869,152 | B2 | * | 3/2005 | Weh ........................ B60T 8/368 303/116.4 |
| 7,237,474 | B2 | * | 7/2007 | Schlitzkus .............. B60T 8/368 417/569 |
| 2001/0016171 | A1 | * | 8/2001 | Schuller ................ B60T 8/4031 417/545 |
| 2009/0068039 | A1 | * | 3/2009 | Alaze .................... B60T 8/4031 417/471 |
| 2010/0266427 | A1 | * | 10/2010 | Haecker ................ B60T 8/4031 417/273 |
| 2012/0042776 | A1 | * | 2/2012 | Gaertner ............... B60T 11/236 92/172 |

FOREIGN PATENT DOCUMENTS

| | | |
|---|---|---|
| DE | 10 2011 089 984 A1 | 6/2013 |
| JP | H 02-225802 A | 9/1990 |
| WO | 96/28661 A1 | 9/1996 |

* cited by examiner

HYDRAULIC UNIT

This application is a 35 U.S.C. § 371 National Stage Application of PCT/EP2015/053189, filed on Feb. 16, 2015, which claims the benefit of priority to Serial No. DE 10 2014 206 906.8, filed on Apr. 10, 2014 in Germany, the disclosures of which are incorporated herein by reference in their entirety.

The disclosure relates to a hydraulic unit, in particular for a controllable-slip vehicle brake system.

BACKGROUND

A hydraulic unit of this kind is known from DE 10 2008 002 740 A1, for example. This known hydraulic unit has a housing block, on which the individual components for controlling the brake pressure in accordance with the existing wheel slip are arranged and hydraulically interlinked. One essential component for this is a pump, which is inserted into a pump receptacle of the housing block and is actuated, e.g. mechanically by an electric motor and an eccentric driven by the latter. Pumps pump pressure medium away from the wheel brakes when required in order to lower the wheel brake pressure or supply pressure medium to the wheel brakes at a high pressure if an increase in the wheel brake pressure is necessary.

Particularly pumps in the form of piston pumps can trigger pressure pulsations owing to the cyclical operating principle thereof, and these pulsations are perceptible as unwanted operating noise in the vehicle. To smooth or damp these pulsations, damping devices are provided on the pump pressure side, said devices generally having at least one pressure medium accumulator with an accumulator capacity (C element) that can vary in accordance with the pressure and at least one restriction element (R element), which is arranged downstream thereof. Spring-operated piston accumulators as pressure medium accumulators are known, for example, said accumulators being arranged in a dedicated accumulator receptacle of the hydraulic unit and being linked to the pump pressure side by pressure-medium-carrying fluid ducts. Known restriction elements include fixed restrictors with a constant restrictor cross section or dynamic restrictors with a restrictor cross section that can vary in accordance with the pressure.

Irrespective of this, the small amount of installation space available in motor vehicles makes it necessary to embody the hydraulic unit and hence the housing block thereof in as compact and weight-saving a manner as possible. One known measure for this is to arrange the fluid duct for linking a switchover valve to an inlet valve of a vehicle brake system on the hydraulic unit in such a way that it intersects a pump receptacle.

If a damping device is then connected to a fluid duct routed in this way in order to damp pressure pulsations, there is then the disadvantage that the restriction element arranged downstream of the pressure medium accumulator represents a flow resistance which has a disadvantageous effect in operating states of the vehicle brake system in which it is important to supply as large as possible a pressure medium volume quickly. These are, for example, emergency braking operations, especially those for avoiding a collision with other road users. Particularly in the case of falling temperatures and, accordingly, increasingly viscous pressure medium, the restricting effect of the restriction element furthermore increases sharply and thereby exacerbates the effect described.

SUMMARY

In contrast, a hydraulic unit in accordance with this disclosure has the advantage that the pressure pulsations of a pump can be reduced in an effective manner without the measures employed for this purpose having a negative effect on the overall size of the building block or on the functional characteristics, especially the pressure buildup dynamics, of the vehicle brake system.

According to the disclosure, there is provision, inter alia, for a second fluid duct which opens into the pump receptacle in the region of the pump pressure side. There is furthermore a separation point in order to seal off the two fluid ducts from one another. The first fluid duct, which intersects the pump receptacle, flows around the pump inserted into the pump receptacle and around the pressure pulsation damper inserted into a damper receptacle, while the second fluid ducts links the pump pressure side to the pressure pulsation damper. The two fluid ducts are brought together downstream of the pressure medium accumulator.

The sealing off of the two fluid ducts from one another can be achieved by modifying already existing unit components and matching configuration of the building block, with the result that, overall, the number of components and the outlay on parts and assembly for the hydraulic unit are increased only insignificantly by the disclosure.

The pressure pulsation damper can be optimized for its actual function of damping pressure pulsations and thereby improving the operating noise of the vehicle brake system without having a negative effect on the functional characteristics of said system, in particular the pressure buildup dynamics.

Further advantages or advantageous developments of the disclosure were obtained from the claims and/or from the following description.

The sealing off of the fluid ducts relative to one another can be achieved in a particularly simple and low-cost way if a closure element, interacting with the housing block, which is provided in any case for closing the pump bore relative to the environment, is used as a unit component for the formation of the separation point. As an alternative instead of the closure element, a cylinder element of the pump, which is provided to guide a piston, can be used.

The separation point can be formed in many different ways through positive and/or nonpositive engagement between the housing block and the unit component and can therefore be adapted to match the specific use. In addition to a reliable and durable sealing effect, fixed anchoring of the respective unit component on the housing block is simultaneously effected in a single operation.

The use of cutting edges on one or more components to be fixed to one another makes it possible to provide the fixing by means of a press-in process which is easy to manage and simple to monitor without using additional material or tools. Given the relatively small dimensions of the pump element, this is advantageous because at least partially automated assembly is thereby possible. The fluid ducts can be produced in a way which is particularly space-saving and particularly simple in terms of production technology if they are aligned substantially at right angles to a longitudinal axis of the pump receptacle and/or if they extend at least partially axially parallel to one another in the housing block.

BRIEF DESCRIPTION OF THE DRAWINGS

Illustrative embodiments of the disclosure are shown in the figures and are explained in detail in the following description.

To aid understanding of the technical background.

DETAILED DESCRIPTION

Figure 1:
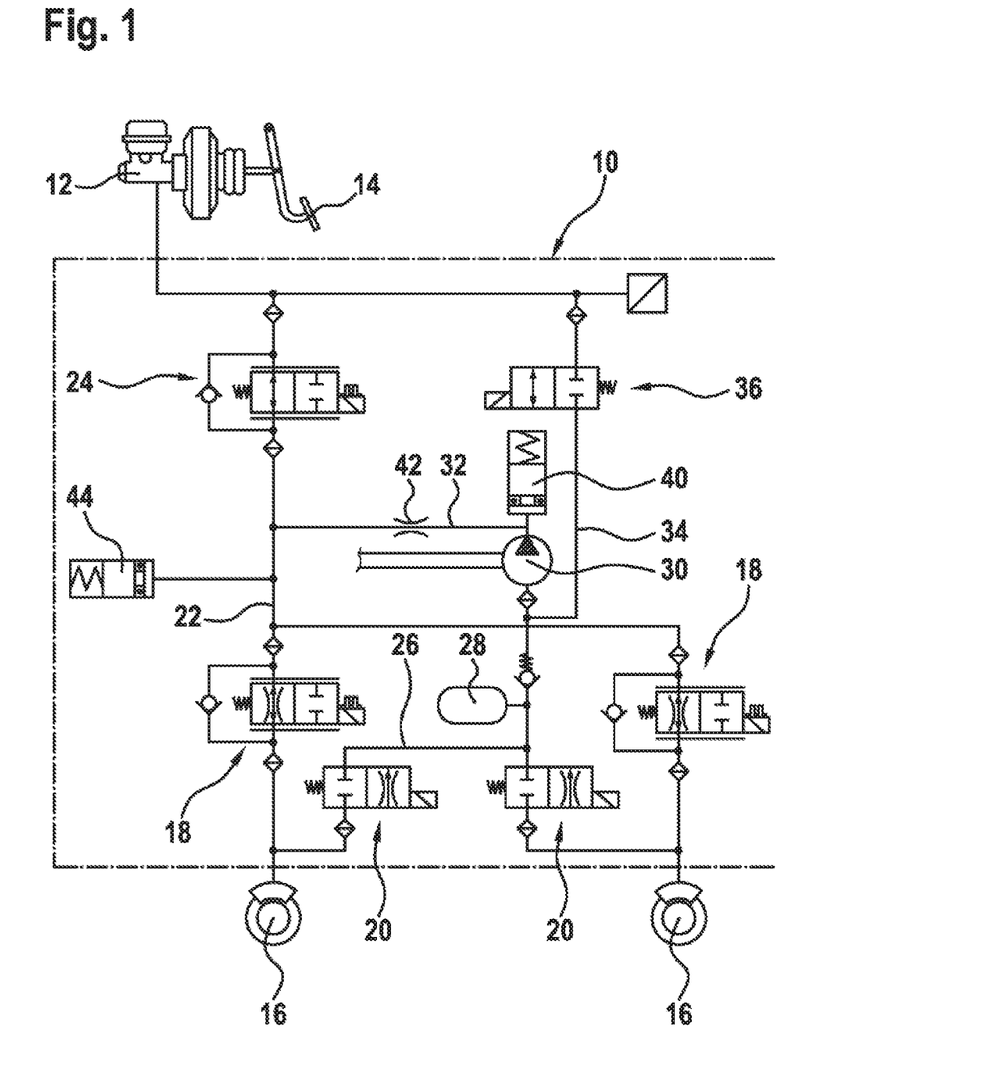
FIG. 1 shows a brake circuit of a controllable-slip vehicle brake system, which is fitted with the components essential to the disclosure.

FIG. 1 shows the hydraulic components of a brake circuit of a vehicle brake system by means of a hydraulic circuit diagram. These hydraulic components are in some cases connected indirectly to a hydraulic unit 10 and in some cases directly to said hydraulic unit 10. The hydraulic unit 10 as such is represented symbolically as a chain-dotted peripheral line in FIG. 1. Connected to the hydraulic unit 10 is a brake master cylinder 12, which can be actuated by the driver via a brake pedal 14. Also connected to the hydraulic unit 10, by way of example, are two wheel brakes 16, which are supplied with pressure medium from the hydraulic unit 10. To control the brake pressure in accordance with the instantaneous slip conditions at the vehicle wheels associated with the wheel brakes 16, what is known as a pressure buildup or inlet valve 18 and what is known as a pressure reduction or outlet valve 20 are associated with each wheel brake 16. The inlet valves 18 are situated in a pressure medium connection 22, which connects the port for the brake master cylinder 12 on the hydraulic unit 10 to a port for one of the wheel brakes 16 shown. To control this pressure medium connection 22, there is what is referred to as a switchover valve 24. If this valve interrupts the pressure medium connection 22 through electronic activation, the brake master cylinder 12 is decoupled from the wheel brakes 16, and the driver cannot change the brake pressure at the wheel brakes 16 by muscle power.

The outlet valves 20 can be opened by electronic activation in order to discharge pressure medium from the wheel brakes 16 when required, if lowering of the brake pressure is necessary. The outflowing pressure medium passes into a return 26 formed in the hydraulic unit 10 and having a buffer reservoir 28 connected thereto, which initially accepts the outflowing pressure medium. An externally drivable pump 30, which pumps the pressure medium out of the buffer reservoir and feeds it back into the pressure medium connection 22 of the brake master cylinder 12 to the wheel brakes 16 via a pump pressure line 32 connected to the pump outlet, is connected downstream of the buffer reservoir 28. For this purpose, the pump pressure line 32 opens into said pressure medium connection 22 in the section between the switchover valve 24 and the inlet valve 18.

If the buffer reservoir 28 for supplying the pump 30 with pressure medium is not sufficient on its own, a suction line 34 is furthermore formed on the hydraulic unit 22, connecting the suction side or pump inlet of the pump 30 to the port for the brake master cylinder 12 on the hydraulic unit 10. Control of this suction line 34 is performed by appropriate electronic activation of what is referred to as a high-pressure switching valve 36.

This arrangement of components or the interaction thereof for control of the brake pressure of the wheel brakes 16 belongs to this extent to the prior art.

In many cases, the pumps 30 used in controllable-slip vehicle brake systems are piston pumps, the pistons of which are driven in a reciprocating manner by an eccentric. This cyclical operation can give rise to pressure pulsations, which can be transmitted into the vehicle and can be perceived there as operating noise or vibrations.

In order to damp pressure pulsations in a relatively low pressure range up to about 40 bar, the pump pressure side interacts with a low-pressure damper 40, to the output side of which a low-pressure restrictor 42 is connected. Together, the low-pressure damper 40 and the low-pressure restrictor 42 form a low-pressure damping device, which, with the pump 30, can form a single subassembly that can be arranged in a pump receptacle 50 of the hydraulic unit 10.

A high-pressure damper 44 for damping pressure pulsations in the high pressure range, i.e. above about 40 bar, is furthermore provided downstream of the low-pressure restrictor 42. A high-pressure restrictor is integrated into the high-pressure damper 44, although this is not visible. Together, the two components form a high-pressure damping device. This is connected, in the region between the switchover valve 24 and the inlet valves 18, to the pressure medium connection 22 leading from the port for the brake master cylinder 12 to the port for the wheel brakes 16.

The disclosure consists in arranging the components explained for damping the pressure pulsations in a manner which is as economical as possible in terms of space on the hydraulic unit 10 and, in particular, in hydraulically linking them in accordance with the circuit diagram shown in FIG. 1 without thereby impairing functional characteristics, especially the pressure buildup dynamics of the vehicle brake system. A first illustrative embodiment in this regard is shown in FIG. 2.

Figure 2:
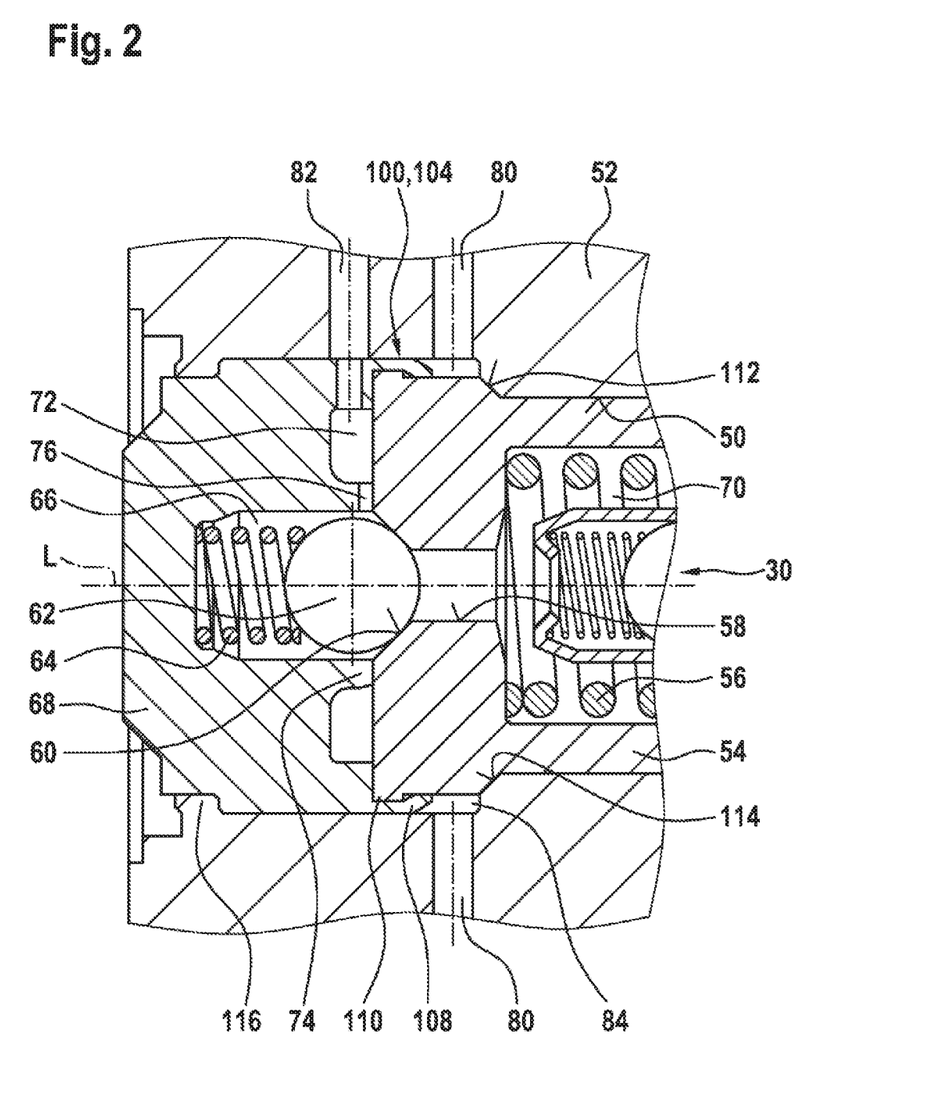
in FIG. 2, a first illustrative embodiment of the disclosure is shown in schematically simplified form by means of a longitudinal section through a hydraulic unit in the region of the pump pressure side.

FIG. 2 shows a detail illustrating the outlet-side or pressure-side end of a pump 30 designed as a piston pump. This pump is installed in a pump receptacle 50 of the housing block 10. The pump receptacle 50 is open to the outside and is closed by a plug 68. A cylinder element 54 of the pump 30 accommodates a piston (not visible in FIG. 2) in an axially movable manner and serves to guide said piston. Actuation of the piston takes place counter to the force of a return spring 56, which is supported on the bottom of the cylinder element 54. In the center of the bottom of the cylinder element 54 there is a through hole 58, which ends in a valve seat 60 of conical design. This valve seat 60 is controlled by a closing member 62, here embodied as a ball by way of example, which, for this purpose, is pressed against the valve seat 60 by a valve spring 64.

The valve spring 64 is supported on the base of a recess 66 in the form of a blind hole in the plug 68. Said plug is anchored nonpositively in the pump receptacle 50 by means of an interference fit.

In the state shown, the closing member 62 rests against the valve seat 60 and thereby prevents pressure medium from emerging from the interior of the cylinder element 54 into the outlet or pressure region of the pump 30. As the piston moves downward in FIG. 2, a pump chamber 70 enclosed by the piston and the cylinder element 54 decreases in size and the pressure in the interior of the pump chamber 70 increases. If the hydraulic pressure force on the closing member 62 becomes greater than the opposing spring force, the closing member 62 rises from the valve seat 60 and pressure medium flows through the through hole 58 to an annular groove 72, which is formed in an end face of the plug 68 facing the cylinder element 54. The annular groove 72 surrounds the valve seat 60 with a radial clearance, resulting in the formation of an encircling land 74 between the annular groove 72 and the valve seat 60. At least one radially extending recess is provided, which crosses the land 74 and can be designed as a restrictor cross section 76. Pressure medium flows through the restrictor cross section 76 to a fluid duct 82, which is formed in the housing block 52 and is referred to below as the second fluid duct 82 to avoid confusion. The latter is arranged substantially at right angles to a longitudinal axis L of the pump receptacle 50 and opens into a damper receptacle 90 (FIG. 3), which is not visible, in the housing block 52 of the hydraulic unit 10. The damper receptacle 90 accommodates the high-pressure damper element 44.

According to the disclosure, what is referred to as a first fluid duct 80 is furthermore provided in the housing block 52, said fluid duct being aligned at least partially axially parallel to the second fluid duct 82 and intersecting the pump receptacle 50. As shown in FIG. 1, this first fluid duct 80 connects the switchover valve 24 of the vehicle brake system to the inlet valve 18 and accordingly forms the pressure medium connection 22. The first fluid duct 80 likewise extends at right angles to the longitudinal axis L of the pump receptacle 50 but, in contrast to the second fluid duct 82, is free from restrictions and thus allows unhindered pressure medium flow from the switchover valve 24 to the inlet valve 18. For this purpose, the pump receptacle 50, together with the pump 30 inserted therein, forms an annular duct 84, which surrounds the installed cylinder element 54 of the pump 30 and into which the first fluid duct 80 opens on one side of the circumference of the pump receptacle 50 and from which it emerges again on the opposite side of the circumference.

According to the disclosure, the two fluid ducts 80 and 82 are sealed off from one another. This is accomplished by means of a first separation point 100, which is formed by a housing section 104 of the pump receptacle 50 situated between the two fluid ducts 80 and 82 in interaction with a unit component inserted into the pump receptacle 50. In the illustrative embodiment shown, this unit component is the plug 68, which closes the pump receptacle 50 with respect to the environment.

Figure 4:
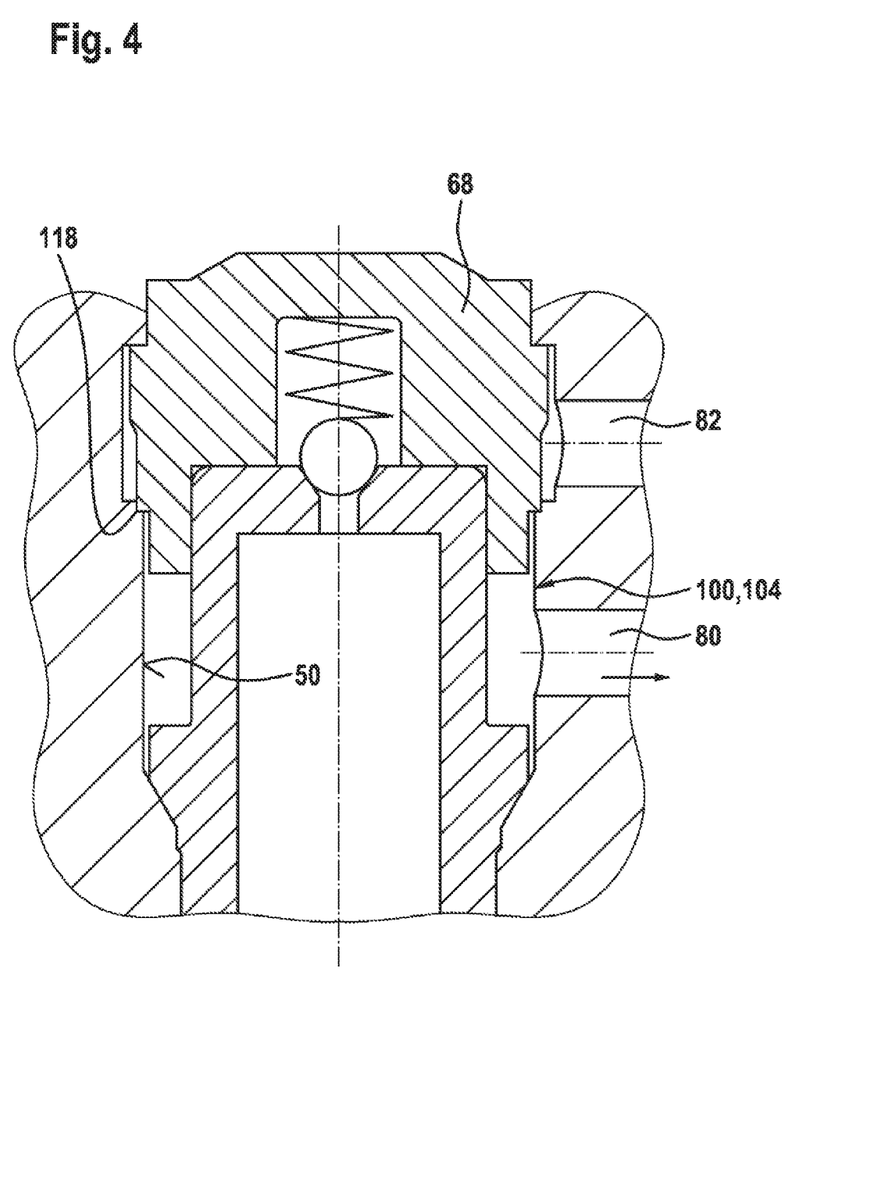
in FIGS. 4 and 5, second and third illustrative embodiments of the disclosure are shown, likewise in longitudinal section.

As an alternative, the cylinder element 54 of the pump 30 could also be used as a unit component, but this is only disclosed in detail below in connection with the description of FIG. 4.

By way of example, the plug 68 and the cylinder element of the pump 30 are coupled to one another mechanically. To form this coupling, the plug 68 is provided with a flange 108, into which the cylinder element 54 projects until the two components rest on one another by means of their respective end faces. In this region, the cylinder element 54 is provided with an encircling, radially projecting collar 110, which is overlapped axially in the direction of the longitudinal axis L by the flange 108. Once the cylinder element 54 and the plug 68 are resting one upon the other, the flange 108 is plastically deformed, as a result of which it engages behind the collar 110 of the cylinder element 54 and thus connects the two components positively to one another to form a subassembly.

This subassembly comprising the plug 68 and the cylinder element 54 is inserted into the pump receptacle 50, more specifically until a chamfer 112 formed on the cylinder element 54 comes to rest on a mating chamfer 114 of the pump receptacle 50 and thereby seals off the pump pressure side from the pump suction side. The plug 68 is oversized relative to the diameter of the pump receptacle 50, making it possible to form a nonpositive joint, i.e. an interference fit, between the plug 68 and the pump receptacle 50. The latter extends as far as the housing section 104 situated between the two fluid ducts 80 and 82 and thus forms the first separation point 100.

Figure 3:
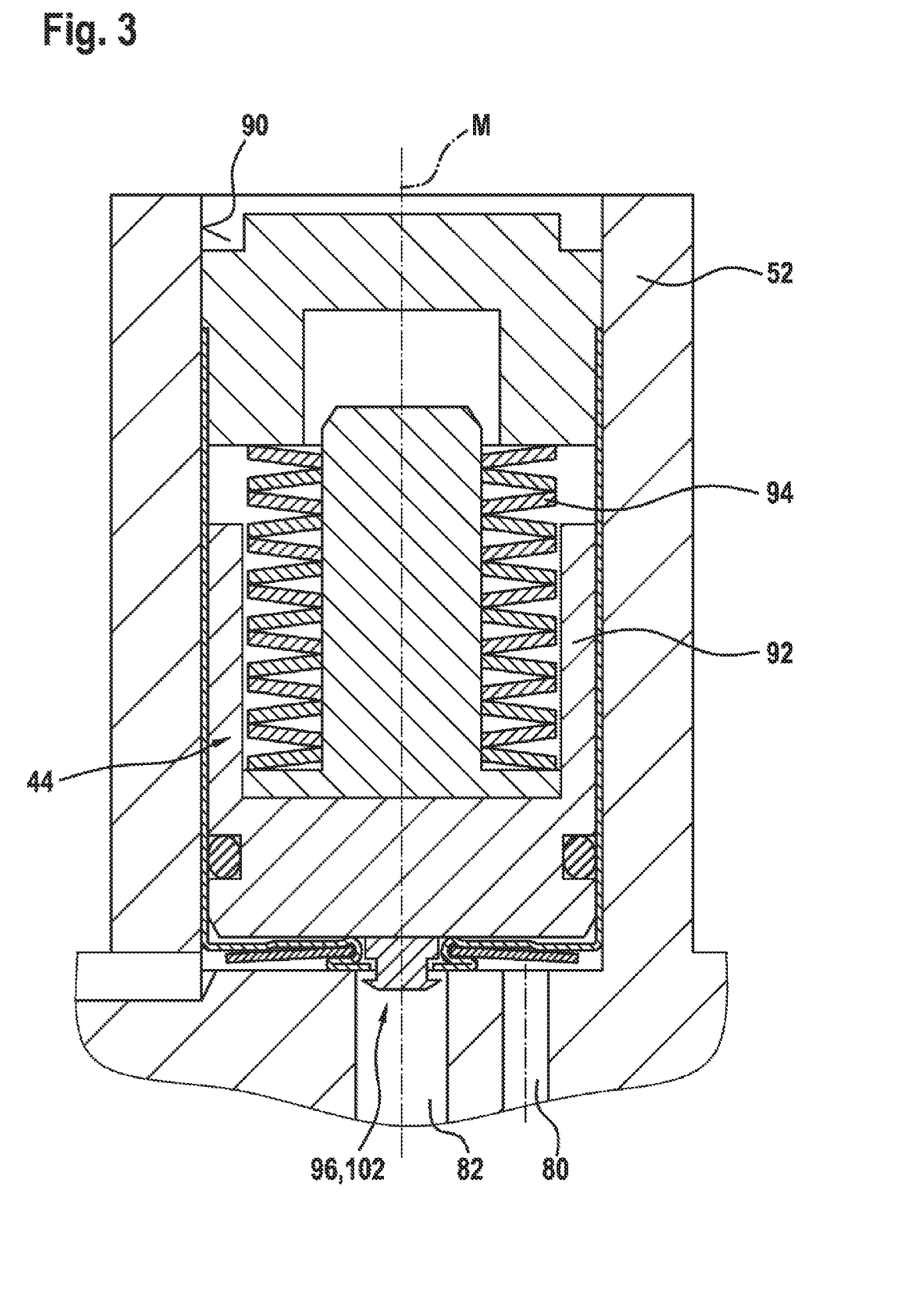
FIG. 3 discloses a longitudinal section through a damper unit installed in the hydraulic unit.

According to FIG. 3, the second fluid duct 82 opens, at the end thereof remote from the pump receptacle 50, into a damper receptacle 90 formed in the housing block 52 for the high pressure damper element 44. The point of entry of the second fluid duct 82 is eccentric with respect to a central axis M of the damper receptacle 90, in a region which allows unhindered flow around a supply valve 96 of the high-pressure damper element 44 installed in the damper receptacle 90. By way of example, said element is fitted with a damper piston 92, which is acted upon by a damper spring 94 and occupies an initial position illustrated in FIG. 4. In this initial position, the supply valve 96 of the damper device is opened by the damper piston 92 and thus forms a pressure medium connection to the second fluid duct 82, which likewise opens into the damper receptacle 90. Any pressure pulsations which occur in the second fluid duct 82 can be damped by virtue of the mobility of the damper piston 92 counter to the force of the damper spring 94.

The supply valve 96 is equipped in a manner not shown with a high-pressure restrictor, through which pressure medium in the high-pressure damper 44 flows out. Downstream of this high-pressure restrictor, the first fluid duct 80 and the second fluid duct 82 open into one another. The supply valve 96 thus acts as a second separation point 102 for sealing off the two fluid ducts 80 and 82 from one another.

A particularly effective nonpositive connection between the unit component or, in accordance with illustrative embodiment 1, the plug 68 and the pump receptacle 50 can be achieved by shrink fitting the plug 68. For this purpose, said plug is cooled, before being pressed in, to a temperature which is significantly lower than the temperature of the building block 52 in the region of the pump receptacle 50. As it subsequently warms up, the radial clamping forces acting on the plug 68 rise to a level which would have required significantly higher axial press-fitting forces without cooling and hence would have increased the risk of unwanted shavings.

FIG. 2 furthermore shows that, if required, the plug and, therefore, indirectly the pump 30 can be secured in the pump receptacle 50 by forming a staked joint 116 in addition to the interference fit. For this purpose, the housing block 52 is plastically deformed in the circumferential region of the pump receptacle 50 by means of a punch in such a way that this material of the housing block 52 overlaps a shoulder 116 provided in the circumferential direction of the plug 68, at least in segments or sections.

Instead of the purely nonpositive connection described between the unit component and the pump receptacle 50 to form the first separation point 100, it is also possible, as an alternative, to provide a combination of a nonpositive and a positive connection. A second illustrative embodiment of this kind is shown in FIG. 4.

In this illustrative embodiment, the unit component or plug 68 is provided on its outer circumference with cutting edges 118 extending axially or in the direction of the longitudinal axis L of the pump receptacle 50. The inside diameter of the pump receptacle 50 is reduced in a certain section at a step to such an extent that the cutting edges 118 cuts into the wall of the recessed section of the pump receptacle 50 as the plug 68 is fitted. A number or group of cutting edges 118 distributed over the circumference of the plug 68 is freely selectable to match the specific use. The cutting edges 118 secure the plug 68 against twisting in the pump receptacle 50 and thus form a positive lock, while they furthermore laterally displace material as they cut into the wall section of reduced inside diameter of the pump receptacle 50 and thus increase the clamping forces acting on the plug 68 relative to the clamping forces that can be achieved by pure nonpositive engagement.

Another variant to illustrate the combination of a nonpositive and a positive first separation point 100 is possible by using a "self-clinch" joint between the pump receptacle 50 and the unit component. This variant is shown in FIG. 5.

In this example, the cylinder element 54 of the pump 30 is used as the unit component. In principle, this consideration could also be applied to the variant embodiments described above.

Figure 5:
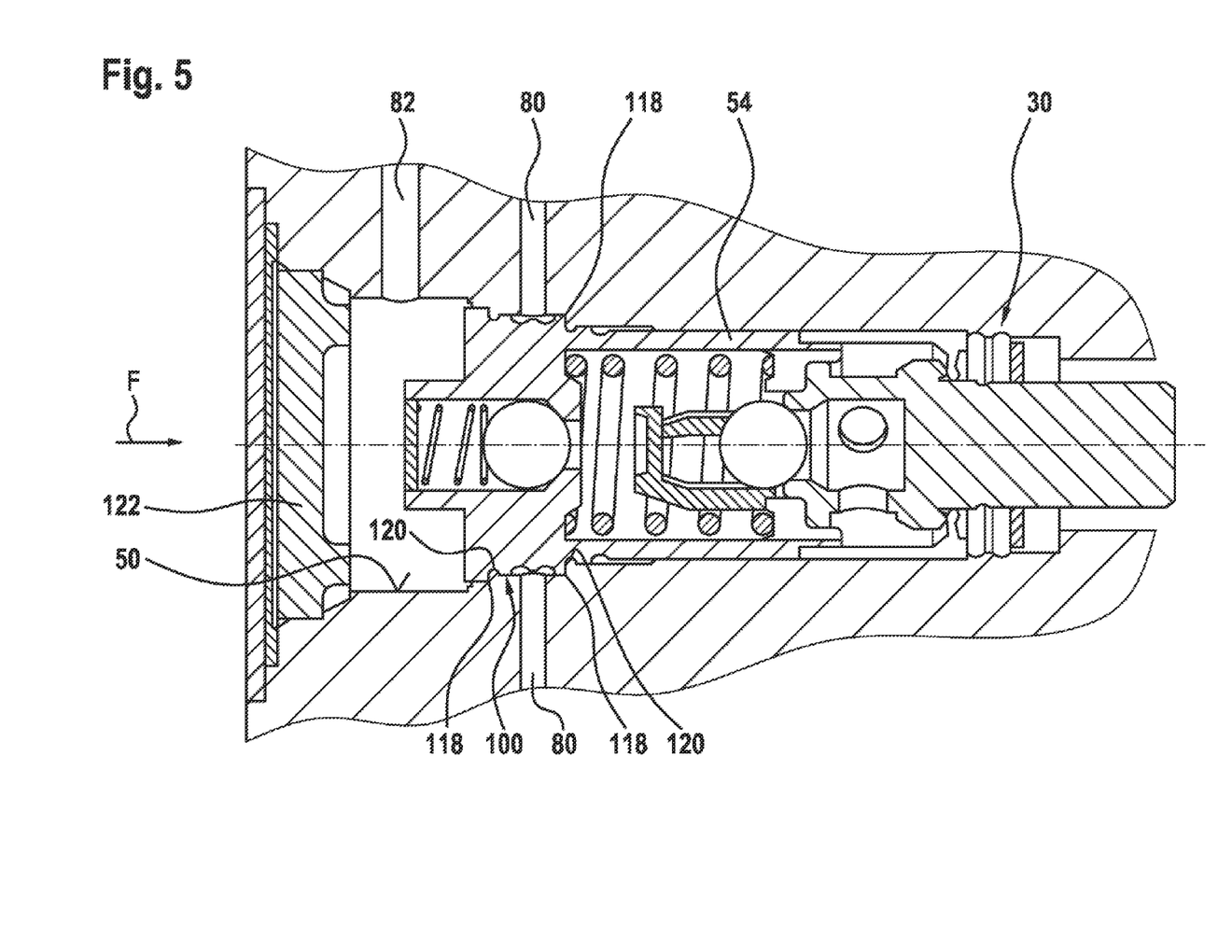

According to FIG. 5, the cylinder element 54 is provided on its outer circumference with annular cutting edges 118. By way of example, two cutting edges 118 are formed, which come to rest on both sides of the entry cross section of the first fluid duct 80 into the pump receptacle 50 when the cylinder element 54 of the pump 30 is in the envisaged final press-fitted position. A plurality of cutting edges 118 on both sides of the entry cross section of the first fluid duct 80 would of course be conceivable. Encircling grooves 120 are formed along the circumference of the cylinder element 54 in the fitting direction of the cylinder element 54, in each case above the cutting edges 118. As the cylinder element 54 is fitted into the pump receptacle 50, the annular cutting edges 118 displace material of the wall of the pump receptacle 50 into said grooves 120 and thus form the positive lock between the components.

To close the opening of the pump receptacle 50 in this illustrative embodiment, a cap 122 of relatively flat design is used, and this cap can likewise be anchored nonpositively and/or positively in the pump receptacle 50.

Of course, further changes or additions to the illustrative embodiments described are conceivable without departing from the basic concept of the disclosure.

The invention claimed is:

1. A hydraulic unit, comprising:
a housing block that defines a pump receptacle configured to receive a pump having a pump suction side and a pump pressure side, the pump suction side located in a first region of the pump receptacle, and the pump pressure side located in a second region of the pump receptacle spaced apart from the first region by a cylinder element of the pump;
a first fluid duct of the housing block opening into the second region of the pump receptacle;
a second fluid duct of the housing block opening into the second region of the pump receptacle; and
a housing section of the housing block defining a first separation point that is disposed between points at which the first fluid duct and the second fluid duct respectively open into the second region of the pump receptacle and that (i) seals off the first fluid duct and the second fluid duct from each other, and (ii) isolates the first fluid duct from a fluid output of the pump, wherein the second fluid duct is connected to the fluid output of the pump.

2. The hydraulic unit as claimed in claim 1, further comprising a damper receptacle that is configured to receive a damper element and that is positioned on the housing block, wherein the first fluid duct and the second fluid duct open into the damper receptacle.

3. The hydraulic unit as claimed in claim 2, wherein:
the damper element is received in the damper receptacle, and
the damper element together with the damper receptacle forms a second separation point that seals off the two fluid ducts from each other.

4. The hydraulic unit as claimed in claim 3, further comprising:
a unit component inserted into the pump receptacle,
wherein the pump receptacle forms the housing section between the first fluid duct and the second fluid duct in an axial direction along a longitudinal axis defined by the pump receptacle, the housing section forming the first separation point in interaction with the unit component.

5. The hydraulic unit as claimed in claim 4, wherein:
the unit component is a plug that closes off the pump receptacle with respect to an environment; or
the unit component is a cylinder element configured to guide a piston of the pump.

6. The hydraulic unit as claimed in claim 4, wherein at least the first separation point is formed by at least one of nonpositive engagement and positive engagement of the unit component with the pump receptacle of the housing block.

7. The hydraulic unit as claimed in claim 6, wherein the nonpositive engagement is formed via a pressing or a shrinking of the unit component into the pump receptacle.

8. The hydraulic unit as claimed in claim 6, wherein:
the at least one of nonpositive and positive engagement of the unit component in the pump receptacle is formed via at least one cutting edge on at least one of the unit component and a wall of the pump receptacle; and
the at least one cutting edge is configured to plastically deform material of the at least one of the wall of the pump receptacle and the unit component as the unit component is inserted into the pump receptacle.

9. The hydraulic unit as claimed in claim 6, wherein:
the at least one of nonpositive and positive engagement of the unit component in the pump receptacle is formed via at least one annularly encircling cutting edge and an annularly encircling groove, arranged in series with said cutting edge, on at least one of the unit component and the pump receptacle; and
the at least one cutting edge is configured to force material of at least one of a wall of the pump receptacle and the unit component into the groove as the unit component is inserted into the pump receptacle.

10. The hydraulic unit as claimed in claim 3, wherein:
the first fluid duct is configured to connect a switchover valve to an inlet valve of a brake circuit of a vehicle brake system;
the first fluid duct is configured to carry pressure medium at least partially around the unit component and the damper element;
the pressure side of the pump opens into only the second fluid duct; and
the damper element is connected to the second fluid duct.

11. The hydraulic unit as claimed in claim 1, wherein:
the first fluid duct is isolated from the second region, and the second fluid duct is isolated from the second region.

12. The hydraulic unit as claimed in claim 1, wherein:
the pump pressure side of the pump defines a restriction through which pressure medium flows out of the pump and into the second fluid duct, and
the housing section isolates the first fluid duct from the restriction.

13. The hydraulic unit as claimed in claim 1, wherein the first fluid duct is free from restrictions.

14. A hydraulic unit, comprising:
- a switchover valve;
- an inlet valve;
- a pump including a pump suction side and a pump pressure side; and
- a housing block fluidically connected to the switchover valve and the inlet valve, the housing block defining a pump receptacle configured to receive the pump,
- a first fluid duct of the housing block opening into the pump receptacle and fluidically isolated from a fluid output of the pump and a fluid input of the pump, the first fluid duct configured to connect the switchover valve to the inlet valve;
- a second fluid duct of the housing block opening into the pump receptacle and fluidically connected to the fluid output of the pump; and
- a housing section of the housing block defining a first separation point that is disposed between points at which the first fluid duct and the second fluid duct respectively open into the pump receptacle and that seals off the first fluid duct and the second fluid duct from each other.

* * * * *